US007451684B2

(12) United States Patent

Müller et al.

(10) Patent No.: US 7,451,684 B2

(45) Date of Patent: Nov. 18, 2008

(54) ACTUATOR DEVICE WITH A MICROWAVE POSITION DETECTING DEVICE

(75) Inventors: Gerald Müller, Stuttgart (DE); Wolfgang Rammler, Stuttgart (DE); Thomas Reininger, Wernau (DE)

(73) Assignee: Festo AG & Co. KG, Esslingen (DE)

( * ) Notice: Subject to any disclaimer, the term of this patent is extended or adjusted under 35 U.S.C. 154(b) by 176 days.

(21) Appl. No.: 11/492,565

(22) Filed: Jul. 25, 2006

(65) Prior Publication Data

US 2007/0035310 A1 Feb. 15, 2007

(30) Foreign Application Priority Data

Aug. 11, 2005 (EP) ................................ 05017445

(51) Int. Cl.

*F15B 15/28* (2006.01)

*G01B 15/00* (2006.01)

(52) U.S. Cl. ............................................. 91/1; 92/5 R

(58) Field of Classification Search ....................... 91/1; 92/5 R; 251/12

See application file for complete search history.

(56) References Cited

U.S. PATENT DOCUMENTS 4,477,052 A * 10/1984 Knoblauch et al. ............ 251/57
4,901,628 A * 2/1990 Krage .......................... 92/5 R
4,936,143 A * 6/1990 Schutten et al. ............... 92/5 R
5,856,745 A 1/1999 Morgan et al.
6,445,193 B1 * 9/2002 Trummer et al. ............ 324/644
6,484,620 B2 * 11/2002 Arshad et al. ................. 92/5 R
6,549,873 B1 * 4/2003 Nagai .......................... 92/5 R
7,095,944 B2 * 8/2006 Trummer .................... 385/147
7,098,671 B2 * 8/2006 Bassali et al. ............... 324/642
7,180,053 B2 * 2/2007 Engstrand ..................... 92/5 R
2005/0191027 A1 9/2005 Trummer

FOREIGN PATENT DOCUMENTS

DE 19833220 6/1999
DE 10205904 A1 8/2003

* cited by examiner

*Primary Examiner*—Thomas E Lazo

(74) *Attorney, Agent, or Firm*—Hoffman & Baron, LLP

(57) ABSTRACT

An actuator or servo device comprises an actuator member adapted to move linearly in the motion space of an actuator housing, a microwave position detecting device for detecting the position of the actuator member in the motion space, the actuator member being capable of producing a pressure wave acting on the position detecting device on approaching the position detecting device and a high frequency microwave antenna arrangement for emitting and receiving microwaves, which are at least partially reflected by the actuator member. The actuator device includes dielectric guard cover means, arranged in front of the microwave antenna arrangement. For mechanically uncoupling the guard cover means from the microwave antenna arrangement between the guard cover means and the microwave antenna arrangement a clearance is maintained to allow deformation of the guard cover means thereinto owing to pressure waves.

19 Claims, 4 Drawing Sheets

ACTUATOR DEVICE WITH A MICROWAVE POSITION DETECTING DEVICE

CROSS-REFERENCE TO RELATED APPLICATION

This application claims priority based on European Patent Application No. 05 017 445.7 filed on Aug. 11, 2005, which is incorporated herein by reference.

BACKGROUND OF THE INVENTION

1. Field of the Invention

The invention relates to an actuator or servo device comprising an actuator member adapted to move linearly in the motion space of an actuator housing, a microwave position detecting device for detecting the position of the actuator member in the motion space, the actuator member producing a pressure wave acting on the position detecting device on approaching the position detecting device and a high frequency microwave antenna arrangement for emitting and receiving microwaves, which are at least partially reflected by the actuator member.

2. Description of the Related Art

Such an actuator is for example described in the German patent publication DE 102 05 904 A1. In this case an actuator device in the form of a pneumatic cylinder with an actuator member is described which is constituted by a piston of the cylinder. The position detecting device comprises a high frequency microwave antenna arrangement for detecting the clearance or, respectively, the position of the piston from an annular abutment, which surrounds the microwave antenna arrangement annularly. On drawing close to the microwave antenna arrangement the piston causes a pressure wave in front of it, which mechanically loads the microwave antenna arrangement and thus for example changes the . position of the microwave antenna arrangement in relation to the housing. Accordingly the clearance measurement signal, which is produced by the position detecting device, is influenced comparatively strongly. Furthermore the measurement-related signal may fail.

SUMMARY OF THE INVENTION

One object of the invention is hence to design an actuator or servo device of the type initially mentioned so as to be less sensitive to mechanical effects.

In order to achieve these and/or other objects appearing from the present specification, claims and drawings, in the present invention there is a provision in the case of an actuator device of the type initially mentioned such that it comprises dielectric guard cover means, arranged in front of the microwave antenna arrangement for the mechanical protection of the microwave antenna arrangement and between the guard cover means and the microwave antenna arrangement for mechanically uncoupling the guard cover means from the microwave antenna arrangement a clearance is maintained to allow pressure wave related deformation of the guard cover means into the clearance.

By virtue of the guard cover means in accordance with the invention the position of the microwave antenna arrangement remains constant and uninfluenced by thermal and pressure effects or is at least substantially constant.

While the guard cover means may deform under the effect of a pressure wave, it remains mechanically separate from the microwave antenna arrangement and conducts any remaining kinetic energy of the actuator member, as for instance the piston of a pneumatic cylinder, into the actuator housing so that the microwave antenna arrangement is not affected by the pressure wave or any other mechanical influences. There is accordingly a mechanical uncoupling between the housing and the microwave antenna arrangement.

The guard cover means preferably includes a plastic, which has a low temperature-dependent change in volume. Suitable materials in this respect have turned out to be for example polycarbonate materials, e.g. Lexan, Makrolon or the like, or liquid crystal copolyesters or polymers (LCP), e.g. Vectra, which exhibits good strength properties and low thermal expansion.

The guard cover means is not electrically conductive and constitutes a dielectric so that the propagation of the microwaves, which for example are at a frequency of 10 MHz to 25 GHz, is not impaired. A particularly convenient form of the invention may even involve the guard cover means forming a sort of secondary radiant system, the dielectric constant and/or the geometry of the guard cover means being matched to suit the microwave antenna arrangement and/or the geometry of the actuator housing so that the microwaves are propagated in a predetermined mode or in predetermined modes in the motion space.

Preferably the guard cover means is connected in a pressure-tight manner with at least one wall of the housing in order to shield the microwave antenna arrangement in a pressure-tight fashion. This pressure-tightness is for example produced by adhesive bonding, screwing, welding or the like. In the case of the wall it may be a question of a side wall, a peripheral wall or an end wall. The guard cover means preferably engages a side wall of the housing. In the case of this side wall it can be a question of a peripheral wall of the motion space and/or of the cover, an end wall of the cover or the like. Between the respective side wall of the housing and the guard cover means preferably at least one seal is placed. If the guard cover means is injection molded on the housing or adhesively joined thereto, such a seal is admittedly advantageous but not absolutely essential.

The guard cover means is preferably arranged to protrude into the motion space. The guard cover means has, as part of an advantageous form of the invention, a terminal abutment for the actuator member. For instance the guard cover means can constitute a sort of impact body and/or a terminal position damper for the actuator member, for example the piston of a pneumatic cylinder.

The guard cover means advantageously constitutes a component of a fluid drive, and in particular of a pneumatic fluid power cylinder. It will be clear that the guard cover means is in principle also able to be employed for electric drives. The actuator member is constituted by a piston or, respectively, the rotor of the respective drive. An other design in accordance with the invention may provide for the guard cover means to be a component of a fluid valve, for example a pneumatic one. The actuator member is preferably provided for driving the valve member. For instance, the actuator member may constitute a component of the valve member.

In the case of the last mentioned designs the guard cover means of the invention will preferably possess at least one fluid duct connected with the motion space.

This fluid duct serves for example for the connection of the motion space or, respectively, of the piston chamber with a fluid connection, for example a compressed air connection. The fluid duct of the guard cover means is preferably provided with a corresponding recess, for example a blind duct and/or a projection. Such compensation means ensure that the microwaves may be propagated in the motion space in a substantially symmetrical manner.

The guard cover means namely preferably exhibits at least one abutment section constituting a terminal abutment for the actuator member. The fluid cable is for example provided in the abutment section. The terminal abutment projects proud of a cover section of the guard cover means for the protection of the microwave antenna arrangement in the direction of the motion space so that the actuator member impinges against the abutment section but not however against the cover section. The abutment section passes mechanical energy past the side of the microwave antenna arrangement and bears against a rear wall and/or a side wall of the housing. The abutment section is for example annular and surrounds the microwave antenna arrangement in an annular fashion. Evidently a sort of support or strut could be provided extending away from the rear wall of the housing toward the motion space and forming a terminal abutment for the actuator member.

The microwave antenna arrangement is preferably connected with a rear wall of the actuator housing, which for example is formed by a cover of the actuator housing. Preferably the guard cover means is also connected with this cover. For such attachment a method involving injection molding in place, adhesive bonding or screwing may be employed. All in all it is convenient for the cover to be set in place as a sort of cover module, with a guard cover means attached to it, on the actuator housing where it is fixed, for example with the aid of bolts, staples, adhesive bonding, welding or the like.

The actuator housing, for instance a cover of the actuator housing, preferably constitutes a component of the microwave antenna arrangement. To take an example, the microwave antenna arrangement may comprise a coupling probe, which together with the housing, forms an electrical conductive structure. The inventive guard cover means protects the sensitive coupling probe against mechanical effects.

The guard cover means is preferably an injection molding. The guard cover means can be manufactured separately from the actuator housing and be later for example screwed and/or adhesively bonded and/or snapped in place. It is in particular preferred however for the guard cover means to be attached by injection molding to the actuator housing, for instance a housing cover.

Further advantageous developments and convenient forms of the invention will be understood from the following detailed descriptive disclosure of embodiments thereof in conjunction with the accompanying drawings.

DETAILED DESCRIPTION OF THE PREFERRED EMBODIMENTS

Figure 1:
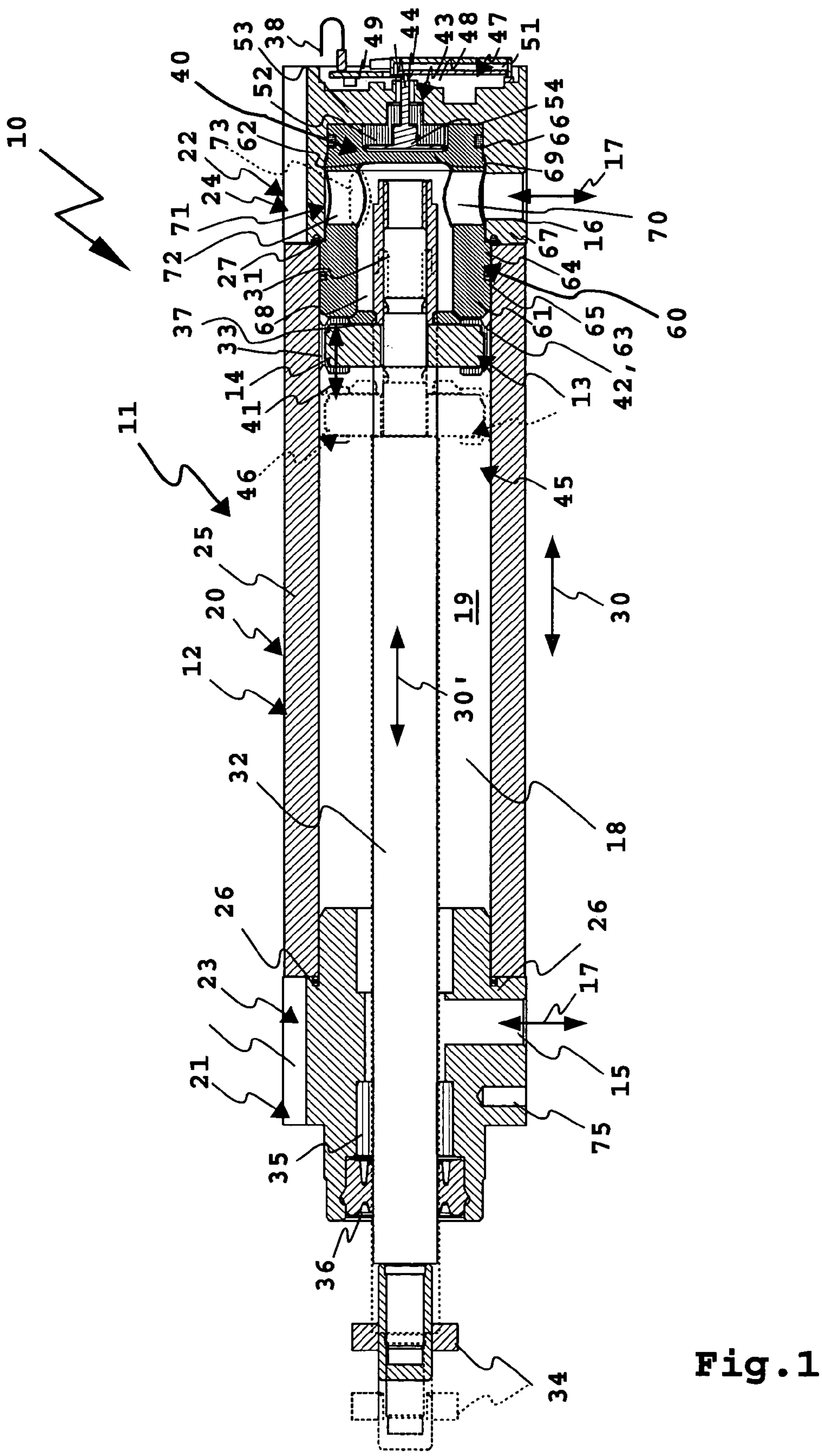
FIG. 1 is a cross sectional view of an actuator device having a position detecting device in accordance with the invention, generally on the line A-A of FIG. 2.
Figure 2:
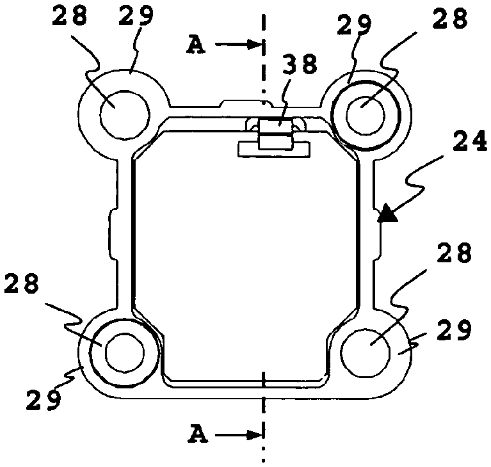
FIG. 2 is a rear view of a cover of the actuator device in accordance with FIG. 1.

A fluid power device is in the form of an actuator device 11 and in particular a pneumatic fluid power cylinder 10. A piston 13 runs in a housing 12 and constitutes an actuator member 14 reciprocating in a linear manner. By way of fluid or compressed air connections 15 and 16 compressed air 17 may flow into a chamber 18, which constitutes a motion space 19 for the actuator member 14, and leave it again for driving the piston 13.

A middle part 20 of the housing 12, for example of metal, is tubular in configuration and has an inner cross section matching an outer cross section and is for example essentially circular. A bearing cover 23 and a terminal cover 24 on the front and rear ends 21 and 22 of the housing 12 close the chamber 18 in a pressure-tight manner. For instance, between the a side wall or peripheral wall 25 of the middle part 20, which delimits the chamber 18 to the outside, and the more particularly metallic covers 23 and 24 seals 26 and 27 are disposed for example, in the form of O-rings. The covers 23 and 24 are screwed in place by bolts 28 on the middle part 20. The bolts 28 for example screwed into bead-like reinforcing and holding ribs 29, which extend along the outer periphery of the housing 12 in the longitudinal direction 30 of the drive cylinder and are disposed in the corner portions of the housing 12, which for example has an essentially rectangular outline. The holding ribs 29 have holes 74, for example in the terminal cover 24, which the bolts 28 extend right through.

The piston 13 is screwed by means of screw arrangement 31 on a piston rod 32. Instead of a screw arrangement 31 a terminal damping means could be placed on the piston 13. Around the piston 13 there extends in an annular manner a seal 33, which divides up the chamber 18 into two space parts in a sealing fashion from each other. The piston rod 32 constitutes a power or force transmitting member, which extends through the bearing cover 23. At the free end of the piston rod 32 attachment means 34, for example an annular flange, are arranged for securing the objects to be actuated. The piston rod 32 runs in a bearing 35 in the bearing cover 23 or end plate. A seal 36, through which the piston rod 32 extends, of the bearing cover 23 constitutes a pressure-tight termination of the chamber 18.

With the aid of assembly means, which for example include an assembly hole in the bearing cover 23, the actuator device 11 is able to be secured on a holding means.

The piston 13 is able to run longitudinally between the bearing cover 23 and the terminal cover 29 in the longitudinal direction of extent as indicate by the arrow 30'. A position detecting device 40 detects the clearance 41 of the actuator member 14 from its terminal position 42 in the vicinity of the terminal cover 24. The position detecting device 40 operates on the basis of microwaves, for example in a range of 1 MHz and approximately 25 GHz or more particularly 3 GHz and 10 GHz, which are emitted by a microwave antenna arrangement 43 with a coupling probe 44 into the motion space 19, which on its inner face at least is essentially electrically conductive and accordingly constitutes a conductive structure 45 for the microwaves.

The actuator member 14 forms a specimen 46 which reflects the microwaves. In a manner dependent on the respective position of the specimen 46 in the motion space 19—one position of the actuator member 14 remote from the terminal end 42 is indicated in chained lines—the phase of the microwaves emitted and received by the microwave antenna arrangement 43 will vary. On the basis of the phase relationship and/or the transit time of the microwaves it is possible for an evaluating means 47 of the position detecting device 40 to detect the position of the actuator member 14 in the motion space 19 and for example to signalize same to a control device, not illustrated, for the control of the actuator device 11, for example a memory programmed control device. The evaluating means 47 for example comprises an emitting means and a receiving means for the emission and reception of the microwaves by means of the coupling probe 44 and other components 80, for example a digital signal processor, a bus coupler, an emission and/or reception means for wired or wireless emission and reception of position signals by means of an antenna 38 to the master control and the like.

The evaluating means 47 includes for example a high frequency board 48 with components (not described in detail) and conductive tracks for producing microwaves and furthermore an evaluating board 49 which for example includes a bus coupler. The boards 48 and 49 are connected together electrically, for example using a plug cable 50. A cover 51 shields the boards 48 and 49, which are disposed for instance in chamber 55 in the housing 12 or, respectively, the terminal cover 24, against environmental influences.

The microwave antenna arrangement 43 comprises an electrically insulating or dielectric holding body 52, which for example has a stepped cylindrical configuration and for example is manufactured of an electrically insulating plastic, in particular one with a low coefficient of thermal expansion. The holding body 52 holds an at least externally electrically conductive antenna pole body 54 of the microwave antenna arrangement 43 in a central position and more particularly coaxially. The holding body 52 and hence the microwave antenna arrangement 43 are held centrally and in particular coaxially in relation to the measurement and, respectively, motion space 19 on a rear end wall 53 of the terminal cover 24, as for example by being plugged, inserted and adhesively bonded, screwed or held in some other fashion on the terminal wall 53 in a corresponding recess or socket 85.

First pole faces of the antenna pole body 54 cooperate with second pole faces of the housing 12 of the conductive structure 45. The antenna pole body 54 extends right through the holding body 52 and is connected by a conductor 84 electrically with the high frequency board 48. The electrically conductive terminal wall 53 and accordingly the housing 12 are connected by way of, for example, a flexible conductor 56 with the high frequency board 48.

A front umbrella-like terminal end wall 76 of the antenna pole body 54, which is disposed to the fore on a central cylindrical antenna part 77, which may have an annular groove 86 for example, extends past the measurement and motion space 19 and is connected by means of a electrical conductor section 78 with the high frequency board 48. The conductor section 78 is trained through the holding body 52 and a channel 87 in the terminal wall 53, preferably at an insulating clearance from the terminal wall 53, to the high frequency board 48 and connected directly, or by way of the preferably flexible conductor 84, with a mechanical decoupling effect, with the high frequency board 48. The terminal 78 lies on a terminal or end side 88 of a front part 81 of the holding body 52, and more particularly on projections 79 with a circularly segment-like form. The front part 81 has a larger periphery than a rear section 82 of the holding body 52, which is taken up in the socket 85. The front part 81 rests on the terminal wall 53 to the front or, respectively, projects past the terminal wall 53.

The microwaves pass in a direction away from the motion space 19 and change from a coaxial mode into a wave guide mode.

The antenna pole body 54 is for example an essentially metallic insert member, which is adhesively bonded and/or welded to the holding body 52 and more particularly i adhesively bonded or welded in the receiving space 59. In accordance with a modification of the invention the antenna pole body 54 is joined to the holding body 52 in a casting method or more especially an injection casting method.

The position of the microwave antenna arrangement 43 in relation to the housing 12 or, respectively, the motion space 19, and however in particular the position of the antenna pole body 54 in relation to the conductive structure 45, which cooperates with the microwave antenna arrangement 43, is essential for exact determination of the clearance or distance 41. In order for such clearances to the adhered to and a high accuracy of measurement to be obtained in the case of the actuator device 11 the following measures are taken.

A guard cover means 60 is disposed in front of the microwave antenna arrangement and protects the microwave antenna arrangement 43 against mechanical effects due to the actuator member 14. The guard cover means 60 comprises an annular abutment section 61, which projects to the front of a cover-like section 62 toward the motion space 19 and constitutes an abutment 63 for the actuator member 14. For instance an annular projection 37 on the piston 13 strikes against the abutment 63. The projection 37 may be a hard or elastic, resilient ring. The abutment section 61 constitutes a sort of ring, which extends around the microwave antenna arrangement 43 and bears against the rear wall or end wall 53 of the terminal cover 24. Accordingly any mechanical forces caused by impact of the actuator member 14 on the abutment 63 are passed on to the terminal cover 24 and accordingly the housing 12 and prevented from affecting the microwave antenna arrangement 43.

The cover section 62 constitutes a sort of floor or intermediate platform in the abutment ring 64, which in the present case is made integral with the abutment section 61. A multipart design with for example screwed together and/or adhesively bonded components for an inventive guard cover means is also possible.

The guard cover means 60 seals the microwave antenna arrangement 43 off from the pressure space and, respectively, the motion space 19 in a pressure-tight fashion. To take one example, the cover section 62 may be integral with the abutment ring 64 so that between the two part no pressure blast may move toward the microwave antenna arrangement 43. Furthermore, on the outer side of the abutment ring 64 seals 65 and 66, e.g. o-ring seals are placed between outer periphery of the abutment ring 64 and the peripheral wall 25 of the middle part 20 and a peripheral wall 67 of the terminal cover 24. The guard cover means 60 has for example sockets 65' and 66', as for example peripheral grooves, to accept the seals 65 and 66.

The abutment ring 64 projects past the terminal cover 24 and extends into the middle part 20. At its front section, between the abutment 63 and the intermediate platform, which constitutes the cover section 62, the abutment ring 64 defines a receiving space 68 for the screw arrangement 31 or a terminal position damping means, not illustrated.

Between the guard cover means 60 and the microwave antenna arrangement there is a clearance or distance 69, into which the cover section 62 may deform, for example owing to a pressure wave or blast, which is caused by the actuator member 14. Accordingly the guard cover means 60 and the microwave antenna arrangement 43 are decoupled from each other mechanically and the microwave antenna arrangement 43 is protected against pressure loads.

The guard cover means 60 comprises a fluid duct 70 for connection of the chamber 18 with the compressed air connection 16, which for example extends through the abutment ring 64.

In order for the microwaves to propagate in the motion space 19 in a substantially symmetrical manner, the fluid duct 70 is provided with a blind duct 71 as a compensating means 71, such duct running along the side of the abutment ring opposite to the fluid duct 70. The blind duct 72 terminates at the peripheral wall 67 i.e. the peripheral wall 67 closes the blind duct 72 in the radially outward direction. The compensating means 71 can also exhibit a projection 73 instead of the blind duct 72 as an example. The projection 73 is for example a ring, a ring segment, a cone or the like.

The guard cover means 60 comprises a dielectric material and in particular a plastic with a low coefficient of thermal volumetric expansion, for example Lexan, Vectra or the like. The guard cover means 60 is matched to suit the radiant characteristic of the microwave antenna arrangement 43 so that the microwaves, which are emitted by the microwave antenna arrangement 43, are propagated in a predetermined mode in the conductive structure 45 or, respectively, the motion space 19.

Figure 3A:
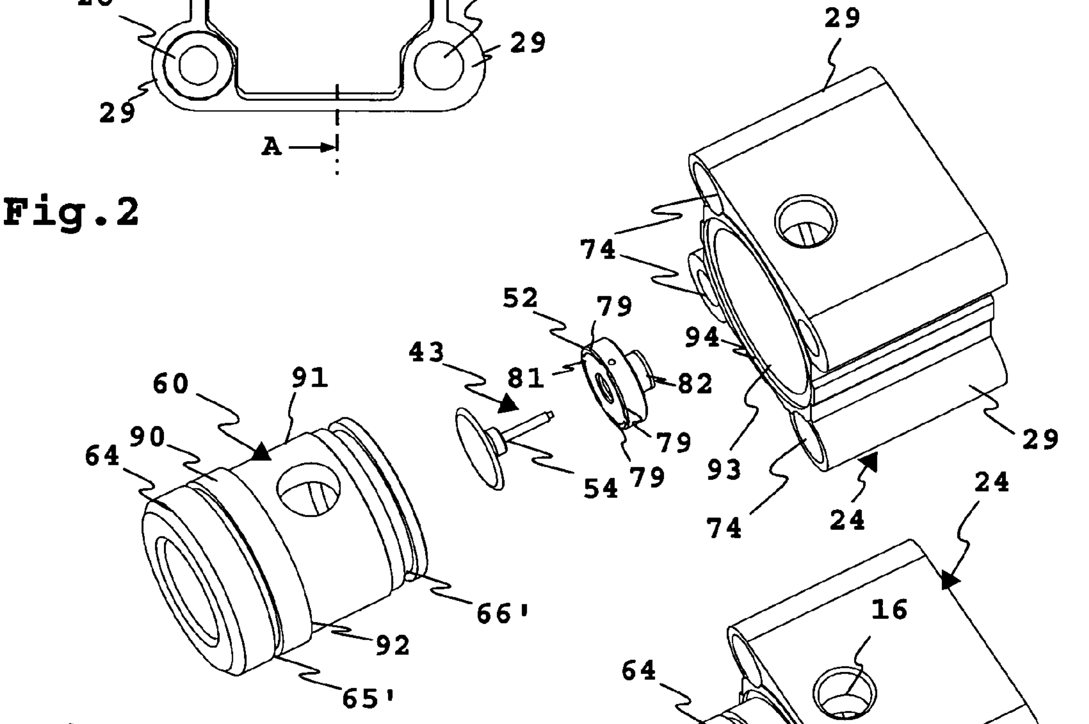
FIG. 3*a* is a perspective exploded view of the cover of the actuator device in accordance with FIG. 2 with a guard cover means, an antenna body and a holding body for holding the antenna pole body with a clearance at or a distance from the cover.
Figure 3B:
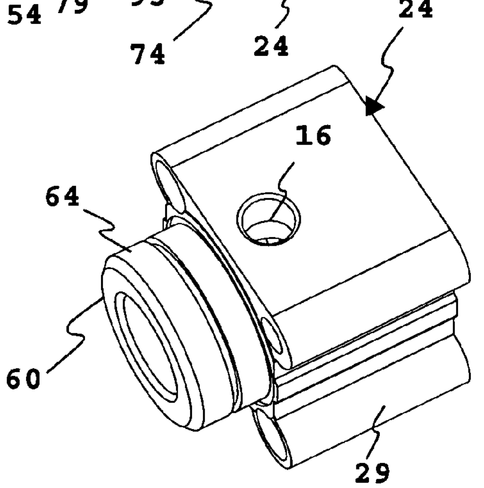
FIG. 3*b* shows the cover with the components according to FIG. 3*a* in the fitted condition.
Figure 4:
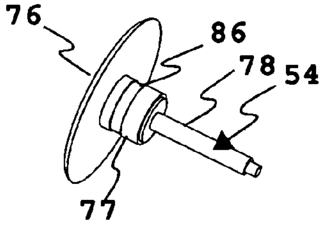
FIG. 4 is a perspective view of the antenna pole body according to FIG. 3*a*.
Figure 5:
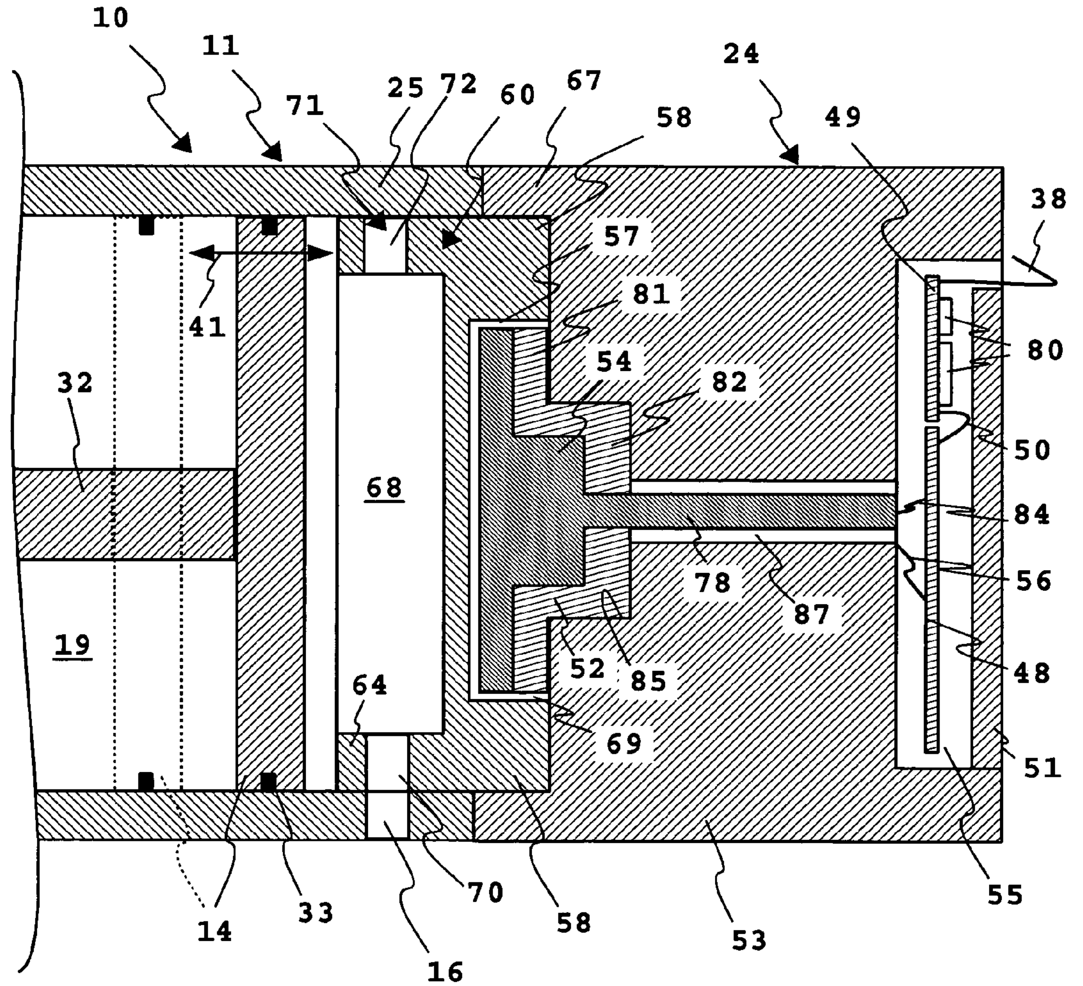
FIG. 5 is a partially diagrammatic view of the position detecting device of the actuator device as shown in FIG. 1.

The guard cover means 60 is preferably, as illustrated in FIG. 3*b* for example, premounted as a whole on the terminal cover 24, and for example plugged in place, adhesively bonded in place, held by detent means and/or screwed in place. Accordingly the guard cover means 24 may be attached bodily in position with the guard cover means 60 already fitted. The guard cover means 60 furthermore constitutes a sort of cover to prevent pressure waves finding their way by way of the microwave antenna arrangement to the evaluating means 47, which is disposed and protected on the rear side of the rear wall or end wall 53 of the terminal cover 24.

A front part 90 of the guard cover means 60 has a larger diameter than rear part 91 so that between the front and the rear part 90 and 91 an abutment 92, as for example a projection, is formed. When the guard cover means 60 is plugged into a socket 93 in the terminal cover 24, the abutment 92 rests on an end face 94 of the peripheral wall 67 of the terminal cover 24. Accordingly the guard cover means 60 bears not only on the rear end wall 53 of the terminal cover 24, which constitutes the floor of the socket 93, but also on the end face 94.

The front part 81 standing proud of the end wall 53 of the holding body 52 is surrounded in a pressure-tight manner by the guard cover means 60 in order to avoid mechanical loads due to the actuator member 14 as it moves close to the microwave antenna arrangement 43. The front part 81 or, respectively, the end wall 76 of the antenna body 54 is arranged in a chamber 57 of the guard cover means 60 at the clearance 69. The chamber 67 is formed by the floor-like cover section 62 and a rear side wall 58, which is a component of the abutment section 61.

Figure 6:
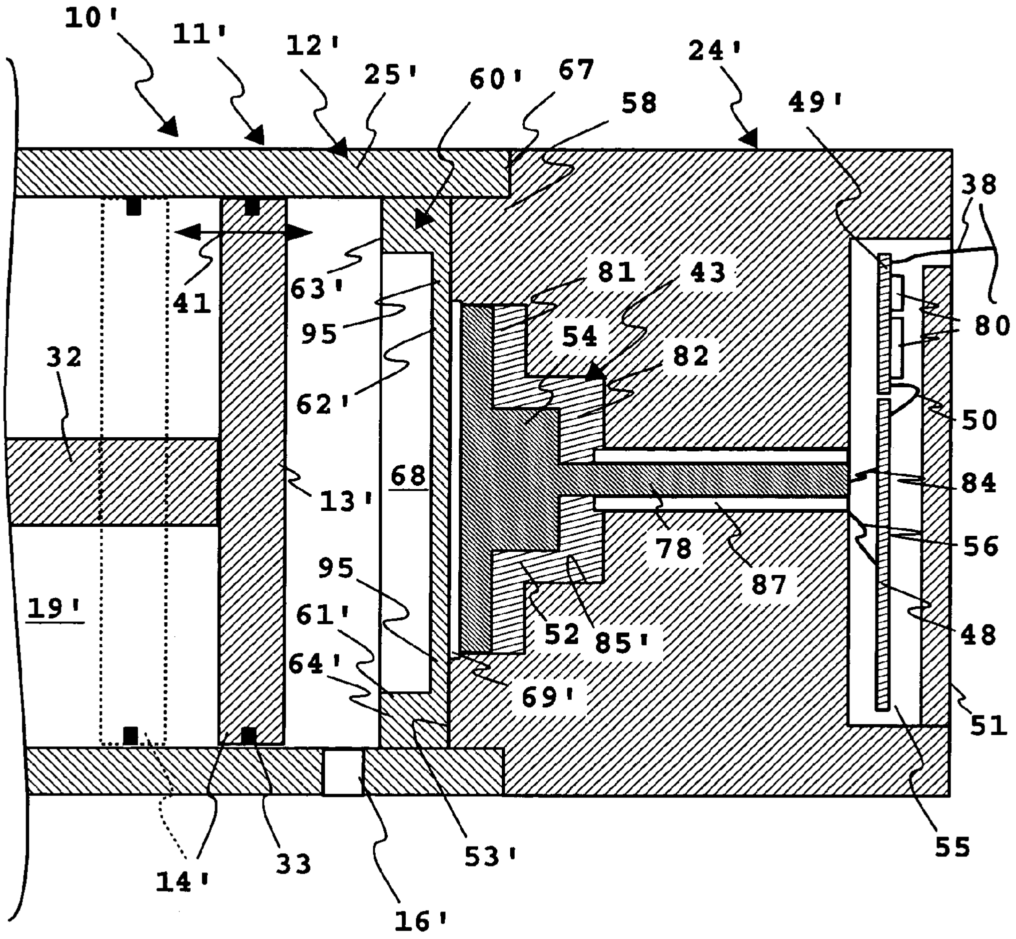
FIG. 6 is a cross sectional view generally as shown in FIG. 5 of a further actuator device with a second embodiment of a guard cover means in accordance with the invention.

A pneumatic power cylinder 10' i.e. an actuator means 11 as shown in FIG. 6 is essentially similar to the power cylinder 10. To this extent in FIG. 6 identical or similar components are denoted by the same reference numerals or reference numerals partly an apostrophe ' to distinguish them.

Unlike the guard cover means 60 the guard cover means now projects less to the fore toward the measuring and motion space 19'. It does not have fluid ducts so that no compensation means are necessary either. The guard cover means 60' bears completely on an end wall 53' of a terminal cover 24'. An abutment ring 64', which constitutes an abutment section 61', projects to the fore in the direction of the motion space 19' and forms an abutment 63' for the piston 14'. A cover section 62' is set back behind the abutment 63' and has an edge part 95 in engagement with the end wall 53'.

A socket 85' of the terminal cover 24' for the microwave antenna arrangement 43 is lower down than the end wall 53' so that the microwave antenna arrangement 43 is set back in relation to the end wall 53' and is at a clearance 69' from the guard cover floor or, respectively, cover section 62'. Into the clearance 69' the cover section 62' may deform, for example owing to a pressure wave caused by the actuator member 14'. The coupling board 49' is connected in a wired manner by way of a conductor 96 with a control device, not illustrated, for the fluid power cylinder 10', which sends the position detect signals relative to the position of the actuator member 14' in the motion space 19'.

The clearance 69' or clearance can be at least partially filled with a yielding and more particularly elastic material.

What is claimed is:

1. An actuator device comprising an actuator member adapted to move linearly in the motion space of an actuator housing, a microwave position detecting device for detecting the position of the actuator member in the motion space, the actuator member producing a pressure wave acting on the position detecting device on approaching the position detecting device, a high frequency microwave antenna arrangement for emitting and receiving microwaves, which are at least partially reflected by the actuator member, and dielectric guard cover means, arranged in front of the microwave antenna arrangement for the mechanical protection of the microwave antenna arrangement and between the guard cover means and the microwave antenna arrangement for mechanically uncoupling the guard cover means from the microwave antenna arrangement a clearance is maintained to allow pressure wave related deformation of the guard cover means into the clearance, the guard cover means engaging a side wall of the housing and in particular a side wall of a cover and/or a side wall of the motion space, at least one seal being disposed between the side wall of the housing and the guard cover means.

2. The actuator device as set forth in claim 1, wherein the guard cover means is connected with at least one wall of the housing in a pressure-tight fashion so that the microwave antenna arrangement is shielded in a pressure-tight fashion.

3. The actuator device as set forth in claim 1, wherein the guard cover means is such as to match the radiant characteristic and/or the reception characteristic of the microwave antenna arrangement.

4. The actuator device as set forth in claim 1, wherein the clearance between the guard cover means and the microwave antenna arrangement is defined by the guard cover means and more particularly a chamber in the guard cover means.

5. The actuator device as set forth in claim 1, wherein the guard cover means projects into the motion space.

6. The actuator device as set forth in claim 1, wherein the guard cover means constitutes a terminal abutment for the actuator member.

7. The actuator device as set forth in claim 6, wherein the guard cover means has at least one abutment section, which forms a terminal abutment for the actuator abutment and projects past a cover section of the guard cover means for the protection of the microwave antenna arrangement toward the motion space and the at least one abutment section extends laterally past the microwave antenna arrangement and bears on a rear wall and/or a side wall of the housing.

8. The actuator device as set forth in claim 1, wherein the microwave antenna arrangement is joined with a rear wall of the actuator housing and more especially a cover of the actuator housing.

9. The actuator device as set forth in claim 1, wherein the actuator housing and more particularly a cover of the actuator housing forms a component of the microwave antenna arrangement.

10. The actuator device as set forth in claim 1, wherein the guard cover means constitutes a component of the actuator housing and more particularly a cover of the actuator housing.

11. The actuator device as set forth in claim 1, wherein the guard cover means is screwed in and/or adhesively bonded in and/or injection molded to the actuator housing and in particular a cover of the actuator housing.

12. The actuator device as set forth in claim 1, comprising a fluid drive and more especially a pneumatic power cylinder, the actuator member comprising a piston.

13. The actuator device as set forth in claim 12, wherein the guard cover means comprises at least one fluid duct connected with the motion space.

14. The actuator device as set forth in claim 1, comprising a fluid valve and more particularly a pneumatic valve, the actuator member being provided for driving the valve member.

15. An actuator device comprising an actuator member adapted to move linearly in the motion space of an actuator housing, a microwave position detecting device for detecting the position of the actuator member in the motion space, the actuator member producing a pressure wave acting on the position detecting device on approaching the position detecting device, a high frequency microwave antenna arrangement for emitting and receiving microwaves, which are at least partially reflected by the actuator member, and dielectric guard cover means, arranged in front of the microwave antenna arrangement for the mechanical protection of the microwave antenna arrangement and between the guard cover means and the microwave antenna arrangement for mechanically uncoupling the guard cover means from the microwave antenna arrangement a clearance is maintained to allow pressure wave related deformation of the guard cover means into the clearance, the clearance between the guard cover means and the microwave antenna arrangement being defined by the guard cover means and more particularly a chamber in the guard cover means.

16. An actuator device comprising an actuator member adapted to move linearly in the motion space of an actuator housing, a microwave position detecting device for detecting the position of the actuator member in the motion space, the actuator member producing a pressure wave acting on the position detecting device on approaching the position detecting device, a high frequency microwave antenna arrangement for emitting and receiving microwaves, which are at least partially reflected by the actuator member, and dielectric guard cover means, arranged in front of the microwave antenna arrangement for the mechanical protection of the microwave antenna arrangement and between the guard cover means and the microwave antenna arrangement for mechanically uncoupling the guard cover means from the microwave antenna arrangement a clearance is maintained to allow pressure wave related deformation of the guard cover means into the clearance, the guard cover means constituting a terminal abutment for the actuator member, the guard cover means having at least one abutment section, which forms a terminal abutment for the actuator abutment and projects past a cover section of the guard cover means for the protection of the microwave antenna arrangement toward the motion space and the at least one abutment section extends laterally past the microwave antenna arrangement and bears on a rear wall and/or a side wall of the housing.

17. The actuator device as set forth in claim 16, wherein the at least one abutment section is substantially annular.

18. An actuator device comprising an actuator member adapted to move linearly in the motion space of an actuator housing, a microwave position detecting device for detecting the position of the actuator member in the motion space, the actuator member producing a pressure wave acting on the position detecting device on approaching the position detecting device, a high frequency microwave antenna arrangement for emitting and receiving microwaves, which are at least partially reflected by the actuator member, and dielectric guard cover means, arranged in front of the microwave antenna arrangement for the mechanical protection of the microwave antenna arrangement and between the guard cover means and the microwave antenna arrangement for mechanically uncoupling the guard cover means from the microwave antenna arrangement a clearance is maintained to allow pressure wave related deformation of the guard cover means into the clearance, the actuator device constituting a fluid drive and more especially a pneumatic power cylinder, the actuator member being constituted by a piston, the guard cover means exhibiting at least one fluid duct connected with the motion space.

19. The actuator device as set forth in claim 18, wherein the at least one fluid duct is provided with a compensation means, more particularly a corresponding recess or a blind duct so that the microwaves may propagate essentially symmetrically.

* * * * *

UNITED STATES PATENT AND TRADEMARK OFFICE

CERTIFICATE OF CORRECTION

PATENT NO. : 7,451,684 B2
APPLICATION NO. : 11/492565
DATED : November 18, 2008
INVENTOR(S) : Müller et al.

It is certified that error appears in the above-identified patent and that said Letters Patent is hereby corrected as shown below:

TITLE PAGE: ITEM (74)

Now reads: "Hoffman & Baron, LLP"
Should read: -- Hoffmann & Baron, LLP --

Column 4, line 53

Now reads: "as indicate"
Should read: -- as indicated --

Column 6, line 6

Now reads: "more particularly i"
Should read: -- more particularly is --

Column 6, line 17

Now reads: "clearances to the adhered to"
Should read: -- clearances to be adhered to --

Column 7, line 54

Now reads: "The chamber 67"
Should read: -- The chamber 57 --

Signed and Sealed this

Third Day of November, 2009

David J. Kappos

David J. Kappos
*Director of the United States Patent and Trademark Office*